June 4, 1968  R. L. BRUNSING  3,386,466
PILOT OPERATED VALVE WITH VENTURI
Filed Jan. 4, 1966
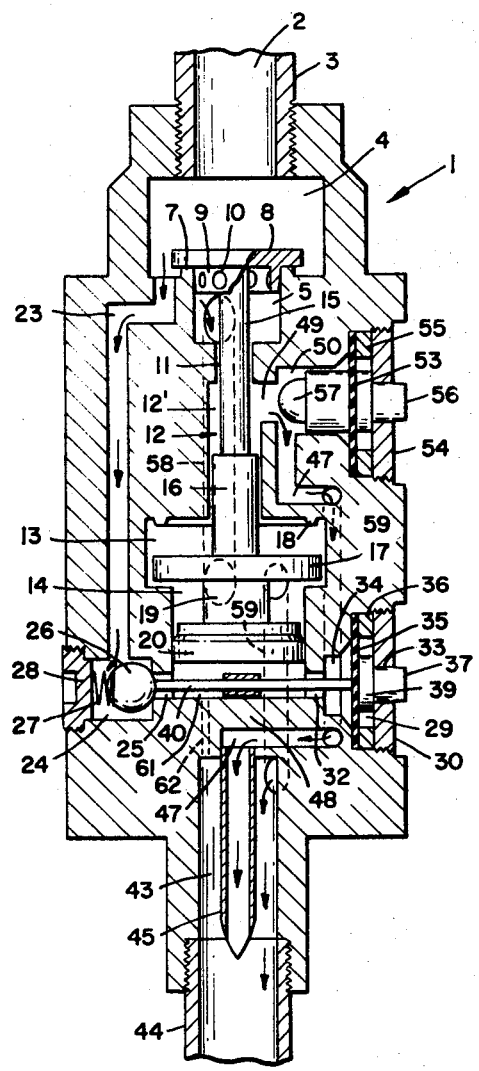
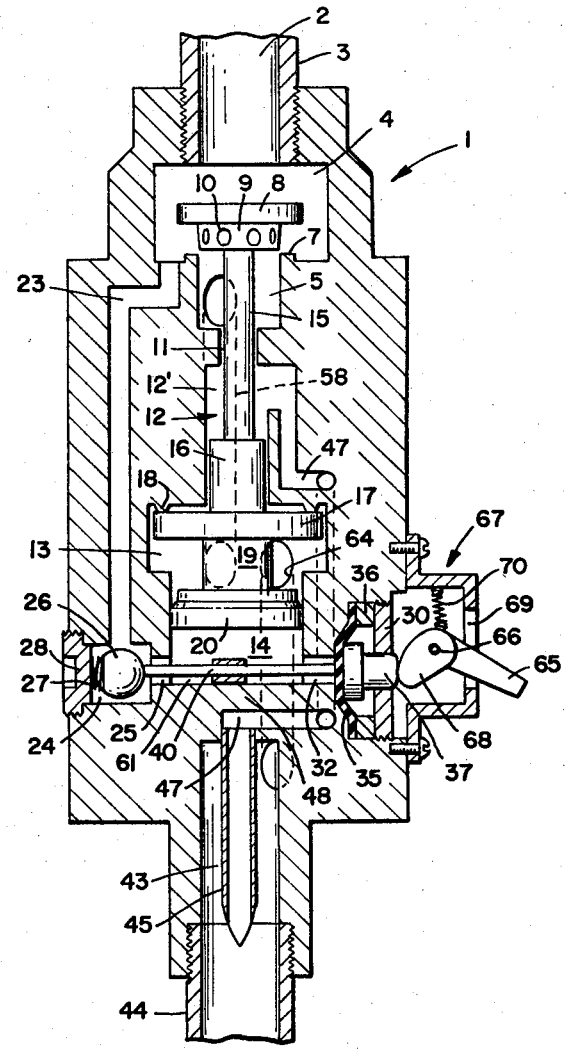
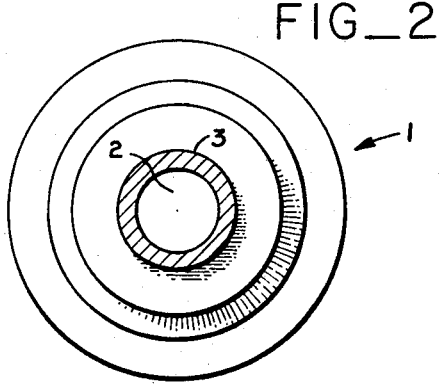
INVENTOR.
REX L. BRUNSING
BY
Boyken, Mohler, Foster & Schlemmer
ATTORNEYS United States Patent Office 3,386,466
Patented June 4, 1968

3,386,466
PILOT OPERATED VALVE WITH VENTURI
Rex L. Brunsing, 345 Golden Gate Ave.,
Belvedere, Calif. 94920
Filed Jan. 4, 1966, Ser. No. 518,577
5 Claims. (Cl. 137—484.8)

ABSTRACT OF THE DISCLOSURE

A valve having an imperforate body provided with a passageway therethrough having an inlet at one end and an outlet at the other end and a valve member in said body movable for opening and closing said passageway to flow of fluid therethrough solely under the influence of pressure differentials in the fluid within said passageway and it will remain open or closed solely under the influence of such pressure differentials according to the position of a manually actuatable member.

---

This invention relates to a valve for use in a fluid pressure line, and has for one of its objects the provision of a valve body having an inlet and an outlet and a passageway between them for flow of fluid under pressure from the inlet to the outlet, and which body is completely sealed against leakage and encloses control means operable by differentials in the fluid pressure within said body for opening and closing said passageway to flow of fluid therethrough.

Another object of the invention is the provision of an improved valve for use in a fluid pressure line for controlling the flow of fluid under pressure therethrough, and which valve includes quick acting fluid-pressure-actuatable means for controlling the flow of fluid therethrough, and the actuation of which means is adapted to be instituted without the employment of a valve stem, packing gland or the like, where a seal is required between a movable element extending from within the valve body to outside the latter through an opening where there would be leakage in the absence of a seal.

A still further object of the invention is the provision of an improved valve as part of a pressure line for use in controlling the flow of fluid in a fluid pressure line, which valve includes a sealed valve body within which a single unitary movable member is adapted to move solely under the influence of fluid pressure within the body for opening and closing said body to flow of the fluid therethrough.

An additional object is the provision of a method and means for controlling the movement of liquid, under pressure, in one direction in an enclosed path of travel past a predetermined point in said path from the upstream to the downstream side of said point by movement of an element in said path from open to closed position and vice versa, solely under the influence of pressure from the fluid in said path.

Other objects and advantages will appear in the description and in the drawings.

In the drawings:

FIG. 1 is a vertical cross sectional view through the valve body, with the movable valve means shown in elevation, and the valve body shown as one piece for purpose of clarity.

FIG. 2 is a top plan view of the valve body of FIG. 1.

FIG. 3 is a cross sectional view of a modified form of the valve shown in FIG. 1 in open position.

The body of the valve, as illustrated, is generally designated 1, and is shown as being cylindrical, and vertically elongated, and is provided with a centrally positioned inlet 2 at its upper end, which inlet may be directly connected with a source of fluid or liquid, or connected with such source through a pipe or tube 3.

Inlet 2 communicates with an enlarged first chamber 4 for maintaining the fluid or liquid within chamber 4, at all times, under the pressure of the fluid in pipe 3.

The bottom wall of chamber 4 may be counterbored to provide a second chamber 5 within body 1 below said first chamber 4, and an upstanding annular seat 7 may be formed around the upper open end of said second chamber 5 for seating against the underside of the marginal portion of a circular disc valve member 8 within chamber 4 in sealing relation to the latter.

Valve member 8 is spaced from the sidewalls and upper wall of the first chamber 4 to permit flow of liquid around said member 8 and into the second chamber 5 when valve member 8 is elevated off the seat 7. Also, valve member 8 may be formed with a downwardly tapering collar 9, that approximately fits within the upper open end of chamber 5 when said valve member 8 is on seat 7, and which collar is formed with a plurality of openings 10 for effecting a progressive increase or decrease in the flow of liquid from chamber 4 into chamber 5, or vice versa, according to the position of the collar. As will later be explained, this structure progressively meters the flow of fluid therepast when the valve is actuated for opening or closing it to flow of liquid therethrough.

A central, vertical passageway 11 within body 1 opens at its upper end into chamber 5, and the lower end portion of said passageway is enlarged at 12. The lower end of said enlarged portion opens into the upper portion of a larger diameter third chamber 13, and this third chamber, in turn, opens into a restricted diameter fourth chamber 14.

The upper end portion of passageway 11 below chamber 5 is of restricted diameter and may function as a guide for loosely guiding a vertically reciprocal vertical valve stem 15 as well as for passage of fluid therepast. The lower end portion 16 of valve stem 15 is enlarged for slidably engaging the walls of lower portion of chamber 12. By this arrangement, the upper part of the enlarged portion 12, designated 12', provides a chamber around the restricted diameter part of stem 15, and the enlarged lower end portion 16 of said valve stem 15 loosely fits the enlarged portion 12 of the central passageway for passage of fluid therepast.

Said lower end portion 16 of stem 15 has a circular disc valve member 17 secured thereto. This valve member is within chamber 13 and the upwardly facing marginal portion of said valve member is adapted to seat against a downwardly projecting annular valve seat 18 that is on the upper wall of chamber 13 when said member 17 is at its uppermost position within chamber 13.

A projection 19 extends downwardly from valve member 17 coaxial with stem 15, and may be considered as a downward extension of said stem, although it is of larger diameter than the enlarged lower portion 16 of stem 15. Said projection 19 extends into the fourth chamber 14 that opens at its upper end into the third chamber 13. A piston 20, coaxial with the projection 19, is secured to the lower end of the latter. This piston may carry a cup washer or other suitable seal for slidable sealing engagement with the cylindrical sidewalls of chamber 14 and to prevent leakage of fluid upwardly past the piston or plunger 20 from the portion of chamber 14 that is below the piston.

A duct 23 is formed in body 1, which duct opens at its upper end into the first or uppermost chamber 4 outwardly of valve member 8 so as not to be effected by opening and closing of the latter. The other, or lower end of duct 23, opens into a small valve chamber 24 that, in turn, is adapted to communicate with the lower or fourth chamber 14 through a side port 25 positioned at a point below the piston 20. A ball valve 26 is within chamber 24, which ball valve is yieldably urged by a spring 27 to a position closing port 25, although the fluid pressure from the fluid within the valve chamber 24 would hold the ball in closed position when there is a reduced pressure in the lower portion of chamber 14 below piston 20.

Valve chamber 24 may be a laterally outwardly opening recess in body 1 to enable insertion of the ball 26 and spring 27, or replacement thereof, with the portion of the sidewalls of the recess at the open side threaded for closure by a cap 28. The spring 27 reacts between the cap and the ball 26 for yieldably holding the ball in closed position. Any suitable conventional gasket or seal may be used to insure against any leakage past cap 28 once the cap is in sealing relation to the body.

At the side of body 1 opposite to valve chamber 24, a laterally outwardly opening recess 29 is formed, the walls of which are tapped adjacent to the open side of the recess for threaded engagement with a circular disc 30, having a central opening 33 formed therein.

The bottom of the recess 29 may be formed with a counterbore 34 that centrally communicates through a port 32 with the lower portion of chamber 14 opposite to port 25, and which counterbore also provides an annular laterally outwardly facing surface at its juncture with recess 29. An imperforate, circular diaphragm 35 of elastic, flexible material such as rubber or synthetic rubber, is seated at its outer marginal portion against said shoulder, and is held in sealing relation therewith by a ring 36 interposed beteen disc 30 and the marginal portion of said diaphragm.

A push button 37 projects through the central opening 33 in disc 30, which projection has an enlarged inner end portion 39 that is adapted to engage the outer side of the diaphragm 35 centrally of the latter, so that said diaphragm will be flexed inwardly upon pressing the outer projecting end of the button 37 inwardly. The diaphragm 35, being imperforate, precludes any leakage of fluid from within body 1, therepast, and the enlargement 39 between disc 30 and the diaphragm substantially precludes outward flexing of the diaphragm under any pressure that develops within the body 1 or chamber 14.

A push rod 40 freely extends through ports 25, 32 across the lower portion of chamber 14 and below piston 20. One end of rod 40 is adapted to be engaged by the inner side of diaphragm 35 and the opposite end is adapted to engage ball 26 so that inward flexure of diaphragm 35 by pressing button 37 will unseat the ball 26, and thereby open port 25 to flow of fluid from passageway 23 and valve chamber 24 into the lower portion of the chamber 14 below piston 20.

Within the lower portion of body 1 is a downwardly opening recess 43, the lower open end of which is open to provide an outlet in which may be secured one end of an outlet pipe 44, if desired, for conducting fluid away from the valve body. Recess 43 may be coaxial with the inlet 2 and within said recess, but spaced from the sides thereof is a vertically disposed open ended tube 45, the upper end of which is secured within a port 46 that, in turn, opens into the lower end of a duct or passageway 47.

The port 46, and the lower end portion of passageway 47 adjacent thereto, are formed in the wall 48 of body 1 that forms the lower closed end of the chamber 14. The lower open end of tube 45 may terminate within the lower end portion, or outlet, of recess 43.

The passageway or duct 47 extends laterally from the upper open end of tube 45, and then upwardly through a sidewall of the body 1 to open into a port 49 that, in turn, opens into the chamber 12' of passageway 11 above the lower end portion 16 of stem 15.

The sidewall of body 1 is formed with an enlarged, laterally outwardly opening recess 50 that, in turn, is coaxial with port 49. A flexible, resilient imperforate diaphragm 53 is secured around its marginal portion within said recess 50 against an axially outwardly facing shoulder formed in the sidewalls of recess 50 in the same manner as in recess 29, and a centrally apertured disc 54 threadedly engages corresponding threads formed in the sides of recess 50 at the open end thereof for engagement with a ring 55 adapted to tightly engage the outer marginal portion of diaphragm 53 for securing said portion in leak proof sealing engagement with the axially facing shoulder at the sides of said recess.

A push button 56 extends through the central openings in disc 54, and projects outwardly of said disc, while the inner end portion of the button 56 is enlarged between the disc and diaphragms 55 and engages the diaphragm.

At the side of diaphragm 53 opposite to, and coaxial with said diaphragm, is a valve member having an inner substantially hemispherical end portion 57 that, in turn, is adapted to engage the edges of port 49 for closing said port upon inward pressure against the projecting end of push button 56 for flexing the diaphragm 53 inwardly and thereby transmitting inward movement of the valve member 57 to close port 47. The enlarged portion of push button 56 that is between the disc 54 and the diaphragm 53 is the same as enlargement 39 on push button 37 and may function to prevent outward flexure of the diaphragm beyond that shown in the drawing under any fluid pressure developed within recess 50.

A passageway or duct 58 formed in one side of body 1 opens at its upper end into the second chamber 5 that is below the valve member 8, and the opposite end of duct 58 opens into the chamber 13.

Another passageway 59 formed in body 1 opens at its upper end within said chamber 13 at approximately the same level as the lower end of duct 58, and the lower end of passageway 59 opens into the upper end portion of the recess 43 adjacent to the upper end of tube 45. The diameter of passageway 59 is preferably smaller than that of the passageway 58, resulting in a higher pressure within chamber 13 than were the passageway 59 of larger or the same diameter than passageway 58.

From the foregoing description it will be seen that there is no point between the inlet 2 and outlet 44 whereat leakage may occur, since the cap 28 positively closes the valve chamber 24, and the diaphragms 35, 53 seal recesses 34, 50 against leakage. In other words, the body 1 may be said to be imperforate and fully sealed between the inlet and the outlet.

In the position of parts as shown in FIG. 1 no fluid is passing through the valve body or into chamber 12, since the chamber 5 and valve chamber 24 are closed.

Upon pressing the push button 37 inwardly to unseat ball valve 26, the fluid under pressure from the inlet will immediately flow through duct 33 and port 25 into the portion of chamber 14 that is below the piston 20 resulting in moving the piston 20 upwardly to thereby unseat valve member 8 in chamber 4 (FIG. 2).

The opening, or unseating of valve 8 will immediately result in the fluid under pressure from inlet chamber 4 flowing into chamber 5 and from the latter through passageway 58 into chamber 13 and out of the latter through passageway 59 into the upper end of discharge passageway 43 and past the lower open end of tube 45, which will result in creating a suction in chamber 12' above the valve 17, and the valve element 17 will seat against the valve seat 18 and will be held there, and the valve 8 will then automatically remain open under a wide range of pressures in the pressure line 3.

It should be noted that the main flow of fluid follows passageways 58, 59 and through chamber 13 below valve 17, so that the full fluid pressure is against the underside of valve 17 which is a substantially larger area than axially facing valve stem area in chamber 12.

The bore 11 through which valve stem 15 passes from chamber 12 into the chamber 5 thereabove is sufficiently loose relative to stem 15 to permit leakage or passage of fluid therepast.

Upon moving push button 56 inwardly to close suction port 49, the suction above the valve member 17 will cease and the fluid pressure above and below valve member 17 will be equalized, with the result that valve 17 will move downwardly to progressively close valve member 8 and stop the flow of fluid through the passageways 58, 59 and through chamber 13 to the outlet 44.

A small bleed opening 61 in the lower portion of chamber 14 below the piston 20 is adapted to bleed fluid from said portion of chamber 14 through passageway 62 into the discharge outlet 43 to permit downward movement of the piston together with that of valves 8, 17, it being apparent that the full pressure of fluid in the inlet chamber 4 will be against valve 8 tending to close the latter. The size of the bleed opening 61 may also determine the rate at which valve 8 is moved to closed position, although such movement is preferably such that the flow through the valve body will cease short of creating a hammer in the pressure line 3.

While the valve structure described has heretofore been mainly employed in controlling the flow of liquids, the claims are not intended to be restrictive to liquids unless specifically so defined.

As a method of controlling the movement of a fluid, under pressure, in one direction in an enclosed path of travel past a predetermined point in said path (such as in chamber 13) from an upstream to a downstream side of said point, such method may be said, in its broadest aspect, to comprise opening said path to the flow of fluid by moving an obstacle in said path to such flow from a closed position to an open position solely under the influence of pressure of fluid in said path. This occurs in the device illustrated by admitting fluid under pressure under piston 20, and decreasing the fluid pressure above the piston and valve member 17, and the closing of said path is accomplished by moving an obstacle (which is valve element 8) to such flow from an open position to a closed position solely under the influence of pressure from fluid in said path, which is the low pressure at the upstream side of the valve element developed by the flow of fluid around tube 45.

In the modification shown in FIG. 3, most of the structural features are the same as described for FIG. 1, and the same numbers are used for corresponding parts.

In FIG. 1 the passageway 59 that communicates between chamber 13 and the recess 43 is of smaller diameter than the passageway 58 that communicates between chamber 5 and chamber 13, with the result that the differential in fluid pressures in chambers 12′ 13 is greater than were passageway 59 to have the same diameter as passageway 58, and this difference in pressures is sufficient to hold valve element 17 in closed position.

In FIG. 3 the passageway 64 that corresponds in position to passageway 59, and that communicates between chamber 13 and recess 43, or outlet 44, is of the same diameter as passageway 58, hence the differential in fluid pressures an chambers 12′, 13 is less than in FIG. 1, and is insufficient in itself to hold the valve element 17 in closed position. Therefore, in the modified form, the ball valve 26, when moved to open position for admitting fluid under pressure to below the piston 20 to actuate the latter for unsealing valve member 8, will remain open until positively actuated for closing it, thereby making up the reduction in pressure in chamber 13 due to enlarging the size of passageway 59, whereby the valve element 17 will be held in elevated position under the influence of the pressure differential between fluid in chambers 12′, 13 plus the fluid pressure below piston 20.

In the modification shown in FIG. 3 the valve member 57 and the upper push button 57 no longer are required for closing valve member 8, and are eliminated so the wall of the valve body is solid leaving the passageway 47 that communicates between the chamber 12′ and tube 45. Upon release of the ball valve 26 to close port 25, the fluid pressure below piston 20 will drop as the fluid drains through the bleed opening 61 and the pressure differential between the chambers 12′ 13 will not be sufficient to hold the valve element 17 elevated in closed position, hence valve 8 will quickly close. Obviously, the rate of closing may be varied by varying the size of the bleed opening 61. The apertured collar 9 has the effect of dampening the closing of valve 8.

Any suitable means may be employed for opening the ball valve 26 such as an arm 65 pivotally supported at 66 in a housing 67 rigid on body 1 that is over push button 37. The outer end of arm 65 projects from the housing for swinging it about pivot 66. The inner end of arm 65 between pivot 66 and push button 37 may have a cam member 68 rigid therewith in engagement with the push button during swinging of said arm between the ends of its strokes, which ends are determined by the length of the slot 69 in housing 67 through which the arm extends. A spring 70 reacts between a side of housing 67 and the juncture between cam member 68 and arm 65 for swinging past center, relative to pivot 66 to yieldably hold the arm 65 at one or the other end of its stroke. Cam member 68 is formed to move the push button 37 for opening ball valve 26 when the arm 65 is at one end of slot 69, as seen in FIG. 3 and to release said ball 26 for movement of the latter under the influence of spring 27 to closed position when the arm 65 is at the opposite end of its stroke.

From the foregoing explanation it is apparent that no outside or auxiliary fluid pressure lines, and no rotary or reciprocating shafts or mechanical means extends through any portion of the valve housing where leakage could occur. The valve body may be divided transversely into sections at any suitable or desired points to facilitate manufacture and assembly of the device and then bolted, welded or cemented together to virtually form an integral housing, and the imperforate diaphragms 35, 53 may be equally inseparably secured in position, if desired, although in instances where replacement may be desirable, provision for access thereto may be provided, as illustrated. The main point is that no apertures or openings exist in the valve body in which an element is movable relative to the body to require a packing gland or the like to effect a seal.

As for the operation of the device itself, the movement of the main valve 8 which opens and closes the body 1 to flow of fluid therethrough from the inlet to the outlet, is solely in response to changes in the pressure differentials of the fluid within the body.

It is to be understood that various changes and modifications may be made without departing from the spirit of the present invention, therefore the scope of the invention should be limited only by the scope of the claims appended hereto.

I claim:

1. A valve for use in a fluid pressure line for opening and closing said line to flow of fluid therethrough, comprising:
   (a) a valve body having a passageway therein for flow of fluid under pressure therethrough in one direction providing an upstream side and a downstream side and an inlet for said fluid at said upstream side and an outlet at said downstream side;
   (b) a valve element supported within said body between said upstream and said downstream side for movement from a closed position closing said passageway to flow of said fluid therethrough from said inlet to said outlet, to an open position opening said passageway to said flow, and vice versa;
   (c) control means within said body movable under the pressure of fluid within said passageway from said upstream side, operably connected with said valve element for moving said valve element from said closed position toward said open position in a direction opposite to said one direction of flow; and,
(d) means operable under the influence of fluid pressure from fluid at the downstream side of said valve element for holding said valve element in said open position against the influence of fluid in said path flowing therepast in said one direction.

2. In a structure as defined in claim 1:
(e) a vertically extending bore formed within said body enlarged at a plurality of points spaced therealong providing in order in a downward direction a first, second, third and fourth chamber, with said first, second and fourth chambers being parts of said passageway, and a portion of said passageway being a bypass outside said bore communicating at its opposite ends with said second chamber and said third chamber respectively;
(f) a vertically extending valve rod supported within said bore for vertically reciprocable movement from an upper position to a lower position and vice versa;
(g) said valve element being within said first chamber and secured to said rod for movement therewith and being in its said open position when said rod is in its said upper position;
(h) said bore being adapted to pass fluid adapted to enter the portion of said bore above said third chamber into the latter, and said control means including a valve member within said third chamber secured to said rod for movement therewith and in a position closing the said portion of said bore to flow of fluid therefrom into said third chamber when said rod is in its said upper position;
(i) said means for holding said valve element in said open position including a suction device spaced within said outlet operable under influence of the movement of fluid to said outlet for discharge therefrom for developing suction therein and a duct communicating between said device and the said portion of said bore for application of said suction to the upper side of said valve member where said bore enters said third chamber.

3. In a structure as defined in claim 1:
(e) a vertically extending bore formed within said body enlarged at a plurality of points spaced therealong providing in order in a downward direction a first, second, third and fourth chamber, with said first, second and fourth chambers being parts of said passageway, and a portion of said passageway being a bypass outside said bore communicating at its opposite ends with said second chamber and said third chamber respectively;
(f) a vertically extending valve rod supported within said bore for vertically reciprocable movement from an upper position to a lower position and vice versa;
(g) said valve element being within said first chamber and secured to said rod for movement therewith and being in its said open position when said rod is in its said upper position;
(h) said bore being adapted to pass fluid adapted to enter the portion of said bore above said third chamber into the latter, and said control means including a valve member within said third chamber secured to said rod for movement therewith and in a position closing the said portion of said bore to flow of fluid therefrom into said third chamber when said rod is in its said upper position;
(i) said control means including a piston secured on said rod supported within said fourth chamber in sealing relation with the walls thereof for vertical reciprocable movement with said rod and said piston being spaced below said valve member and adjacent to but spaced above the lower end of said fourth chamber when said rod is in its said lower position with said valve element in its said closed position;
(j) a duct separate from said bore communicating between said first chamber and the lower portion of said fourth chamber;
(k) a manually actuatable valve in said duct actutable for movement from a closed position closing said duct to flow of fluid therefrom into said fourth chamber below said piston to an open piston in opening said duct to said flow whereby fluid under pressure from said inlet will be admitted into said fourth chamber below said piston for moving the latter upwardly and thereby moving said valve element to said open position.

4. In a structure as defined in claim 3:
(l) said manually actuable means including an opening formed in one of the sides of said body and a flexible diaphragm stationarily secured to said body extending across said opening closing the latter against leakage of fluid therepast, and a valve body within said body operably connected with said diaphragm for movement to open said duct upon inward flexing of said diaphragm relative to the outside of said body;
(m) said housing and said diaphragm forming an imperforate outer wall of said valve body except for said inlet and said outlet.

5. In a structure as defined in claim 1:
(e) said body having completely imperforate outer sides except for said inlet and said outlet, and
(f) a portion of said sides being flexible for yieldable inward and outward movement relative to the inside of said body;
(g) a valve actuating member at the downstream side of said valve element connected with said valve element for movement therewith, and a duct communicating with said passageway at the upstream side of said valve element and said valve actuating member for so moving said valve element from its said closed position toward its said open position when said duct is open to flow of fluid from said upstream side thereof to said valve actuating member; and
(h) valve means in said duct closing said duct to flow of fluid to said valve actuating means;
(i) means operably connecting said valve means with saidyieldable portion of the wall of said housing for moving said valve means to open position opening said duct to flow of fluid to said valve actuating means upon inward flexing of said yieldable portion, the latter being accessible for manual inward flexing from outside said body.

References Cited

UNITED STATES PATENTS

| | | | |
|---|---|---|---|
| 1,046,492 | 12/1912 | Ranson | 251—33 X |
| 1,646,640 | 10/1927 | Daniel | 137—484.8 X |
| 2,408,708 | 10/1946 | Tweedle | 251—33 X |
| 2,417,994 | 3/1947 | Sheets | 251—24 |

FOREIGN PATENTS 490,972  2/1954  Italy.

M. CARY NELSON, *Primary Examiner.*

A. ROSENTHAL, *Assistant Examiner.*